W. N. MORLEY.
PROCESS OF TREATING GARBAGE OR OTHER VEGETABLE OR ANIMAL MATTER.
APPLICATION FILED MAR. 6, 1913.

1,096,854.

Patented May 19, 1914.
2 SHEETS—SHEET 1.

WITNESSES

INVENTOR
WILLIAM N. MORLEY
BY
ATTORNEYS

W. N. MORLEY.
PROCESS OF TREATING GARBAGE OR OTHER VEGETABLE OR ANIMAL MATTER.
APPLICATION FILED MAR. 6, 1913.

1,096,854.

Patented May 19, 1914.
2 SHEETS—SHEET 2.

WITNESSES

INVENTOR
WILLIAM N. MORLEY
BY
ATTORNEYS

UNITED STATES PATENT OFFICE.

WILLIAM N. MORLEY, OF TORONTO, ONTARIO, CANADA, ASSIGNOR OF ONE-HALF TO JULIUS CREDO, OF NEW YORK, N. Y.

PROCESS OF TREATING GARBAGE OR OTHER VEGETABLE OR ANIMAL MATTER.

1,096,854.      Specification of Letters Patent.      Patented May 19, 1914.

Application filed March 6, 1913. Serial No. 752,268.

*To all whom it may concern:*

Be it known that I, WILLIAM N. MORLEY, a citizen of the Dominion of Canada, and a resident of Toronto, Province of Ontario, Dominion of Canada, have invented a certain new and useful Improvement in Processes of Treating Garbage or other Vegetable or Animal Matter, of which the following is a specification.

The process relates to a method of treating garbage or other animal or vegetable matter in such a manner as to convert the same into a relatively dry, commercially useful product without creating or multiplying objectionable fumes, odors or gases and without polluting the atmosphere in the neighborhood of the plant with offensive odors.

The plant adapted to carry out the process of this invention is illustrated in the accompanying drawings in which—

Figure 1:
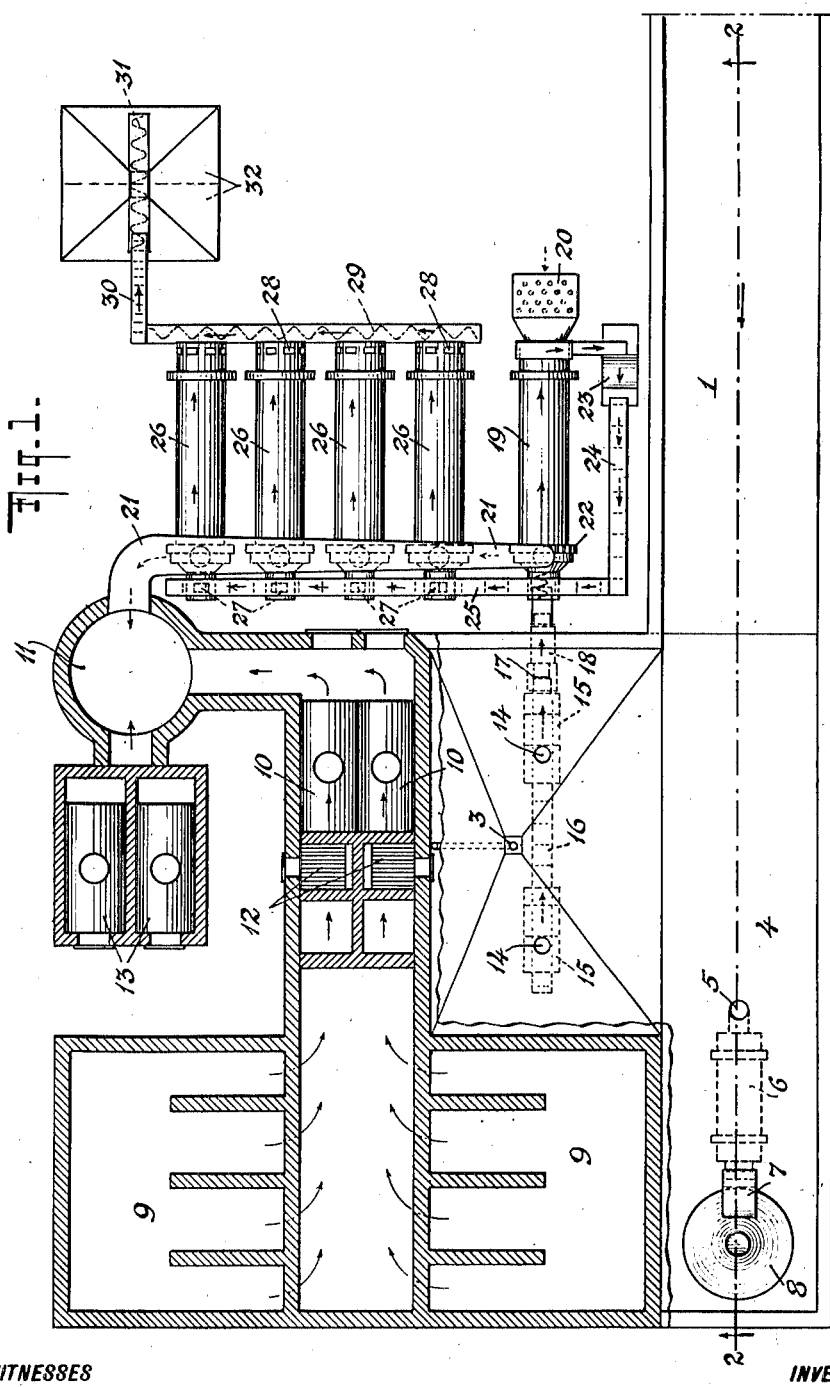
Figure 2:
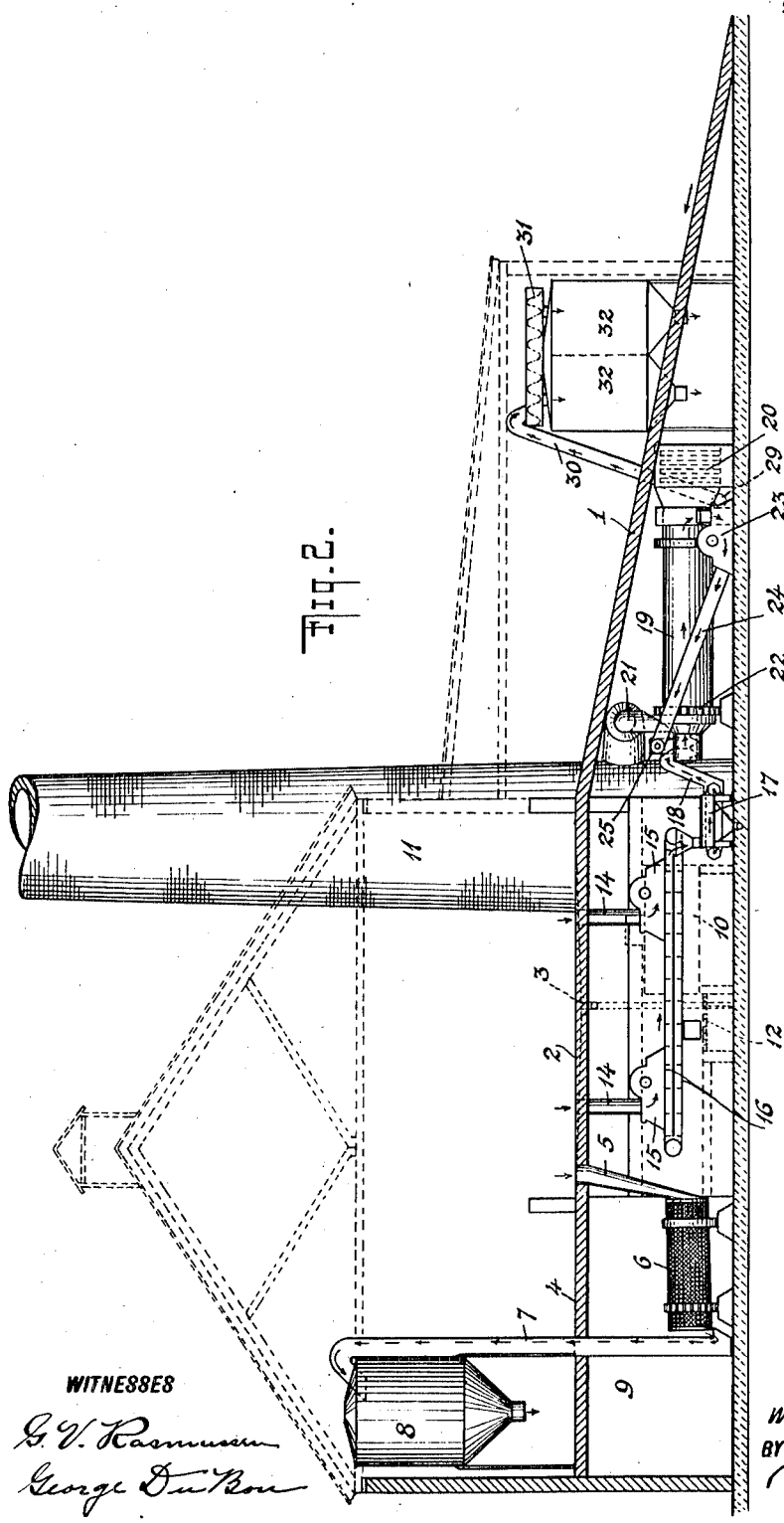

Figure 1 is a general plan view partly in section of a garbage disposal plant. Fig. 2 is a sectional elevation taken on approximately the line 2—2 of Fig. 1.

The disposal of the city's garbage in a sanitary and profitable way has occupied inventors for many years. In some existing plants the garbage is incinerated completely while in others the garbage is cooked or boiled for several hours whereby a large part of the grease is recovered, the balance of the grease being extracted by a naphtha percolation process. The combustion or incinerating process above described is uneconomical and the boiling process described results in offensive odors which pollute the air sometimes for miles in the neighborhood of the plant besides which the extraction of grease, although effecting a certain amount of saving, involves a very complicated and relatively expensive plant.

One of the main objects of this invention is to overcome and avoid the boiling process entirely thereby saving coal, labor and expensive machinery.

The present invention is based upon the observation that the moisture which is contained in the garbage or kitchen waste constitutes its offensive ingredient and that if this moisture be removed the solid matter will be restored to its original food value. This is not true however if the garbage is boiled or cooked because after such process the solid matter is fit only for use as fertilizer and no longer contains in a condition to be restored to a useful food product the alimentary ingredients which were contained in the original substances before they became affected by water constituents thereof.

The present invention as embodied in the plan shown in the drawings requires a reduction plant and presupposes a division of the city's waste into three parts; first, ashes, bottles, broken crockery, etc.; second, refuse consisting of combustible material such as paper, rags, wood, etc.; and third, kitchen waste composed of vegetable and animal matter such as is usually found in all kitchens.

The city's waste is brought into the plant shown in the drawings in carts or wagons which drive up the incline 1 of the platform 2. The platform 2 is a drainage platform provided with the usual drain 3 located at the lowermost point of the platform. The kitchen waste consisting of vegetable and animal matter is dumped on the platform 2 while the carts containing ashes, cinders and the like discharge their contents on the platform 4 from which such products are discharged into the chute 5, passing down to the screen separator or sifter 6. The cinders or other combustible matter still contained in the sifter 6 is carried by the elevator 7 into the storage vat 8 from where its contents are from time to time as required withdrawn and brought into the incinerator or destructor 9. The construction of this incinerator may be of any well known character, the general construction of such combustors being well known. The paper, rags, etc., that come to the disposal plant are directly dumped into the incinerator 9 and the heat created by combustion in the incinerator is conveyed by drawing off the gases in the direction indicated by the arrows shown in Fig. 1 to the boilers 10 where the heat of these gases may be utilized before the gases pass into the stack 11. In case the heat of the gases is not sufficient to run the boilers 10 or in case it is desired to clean these boilers or if for any other purpose the boilers 10 are not to be exposed to the heat of the incinerator gases they may be by-passed into the stack by an obvious connection not shown in the drawings. In some cases it is necessary to use auxiliary heat for the boilers 10 and for this purpose the grates 12 are provided so that coal may be provided at that point to heat the boilers 10 directly or to raise the temperature of the gases coming from the incinerator should this be too low to destroy the obnoxious odors. In some cases or for some purposes it is not necessary to use the boilers 10 at all and then the boiler system 13 is alone used for the purpose of producing the steam or power necessary in the plant. These boilers 13 are of the ordinary construction when heated by coal. This is the case for instance when the boilers 10 require cleaning, which they frequently do, so that in many plants it is economical to run both systems of boilers 10 and 13 simultaneously.

The vegetable and animal waste or garbage is taken from the platform 2 through the chutes 14 in the shredders 15. Two of these shredders 15 are shown, but their number may be reduced or increased according to the capacity of the plant. These shredders 15 are of such character as to preferably reduce the garbage to pieces of about one-half inch or less. For the purposes of my invention I have found that the shredder known as the Williams shredder can be employed so that it is not necessary to describe in detail the particular construction thereof; the same being well known, the general principle of the Williams shredder being to disintegrate the material by repeated blows of a large number of loosely hinged hammers, the effect of which is to reduce the entire material into smaller shreds which are forced through the screen at the bottom. From the shredders 15 the garbage now in the form of small pieces is carried by the drag conveyer 16 to the press 17. This press 17 must be of such a kind as to extract a very material portion of the free water of the contents of the garbage, the object of the press being to take the water out mechanically. The press 17 may be of any suitable construction and requires no specific description. One press which may be used for this purpose is placed upon the market by the Louisville Drying Machinery Co., a reference to which is sufficient to show the particular construction. The water which comes from this press 17 is drained off into the sewer. The compressed and now relatively dry garbage is passed by the elevator 18 into what I call the pre-drier 19. This pre-drier has a worm conveyer in the throat piece indicated by dotted lines and a radiator 20 at the opposite end. This radiator 20 may be a steam radiator of ordinary construction, the steam being supplied from the boilers. The air which is drawn through the radiator by the draft of the stack is thereby heated and passes over the garbage in the rotating drum 19, passing out of said drum together with a considerable amount of moisture taken up from the garbage through the pipe 21 into the stack 11. The drum or pre-drier 19 is rotated by means of the gearing 22. About 10 to 15% of the moisture remaining in the compressed garbage is removed in this pre-drier 19. The interior of the pre-drier 19 is preferably provided with angle irons or projections which cause the material in the drier to be stirred or broken up. These angle irons may also be so arranged as to cause the contents of the drum 19 to travel in a direction toward the radiator and contrary to the direction of the incoming hot air. When the thus dried garbage reaches the radiator end of the drum 19 it is shown as being passed through another shredder 23 of the same general construction as the shredders 15 previously described. The object of this shredder 23 is to again break up the mass into small pieces because in the pre-drier 19 the material tends to cake up and become converted into lumps of uneven sizes. If the extraction of water from the garbage by means of the press 17 and the pre-drier 19 is sufficient to prevent the caking up of the material it may be directly passed into the battery of driers 26, but in general it is preferable to employ the additional shredder 23. Instead of passing through the pre-drier 19 the garbage may after passing through the press 17 be passed through a direct heat drier. For this purpose any well known type of direct heat drier, such as the Atlas drier may be employed. From the shredder 23 which converts the material into small pieces of perhaps one-quarter of an inch or less in size the inclined drag conveyer 24 carries the material to a horizontal conveyer 25 from which it is discharged into the battery of driers 26 through their orifices 27. The driers 26 are steam driers being provided in the interior with a series of longitudinal radiating pipes preferably of different sizes. Through these pipes steam is passed. The driers 26 are rotated and in this way every particle of the garbage comes into contact with the steam pipes in the driers and becomes freed from its remaining extractable moisture. The gases produced in these driers are shown as emerging into the flue 21 which connects with the stack 11. It is obvious that these driers may have independent connection with the stack. The thoroughly dried garbage leaves the driers 26 through the apertures 28 and is carried by means of the screw conveyer 29 to the inclined elevator 30 to the screw distributer 31 which brings the dry garbage into the storage tanks 32. The garbage thus treated as it is contained in the storage tanks 32 is free from obnoxious odors or tastes and is suitable for use as a food for animals, such as hog feed. The finished product may be put up in bags and shipped in car load lots as a valuable article of merchandise. For other purposes this finished product may be treated with a naphtha percolation process for the extraction of grease. Being in this condition free from obnoxious features the product may be used or treated for any other desired purpose. It will be noticed that throughout the treatment of the garbage it has been exposed to manipulations and processes which take from the garbage the water constituent only so that the finished product contains everything of value which the kitchen waste may have originally possessed. It should also be noticed that at no time during the process is the garbage exposed to any boiling process because it is one of the main objects of the invention to so treat the garbage as to prevent decomposition or chemical changes therein such as are brought out by the ordinary boiling process. The further advantage of the present system over that which involves the boiling of the garbage for extracting the grease will be found in the fact that the plant may be under one roof. It is not necessary furthermore to convey the kitchen waste a number of miles beyond city limits in order to treat it as is now the case in some communities. No offensive odors being produced by my process, the garbage disposal plant may be operated in the heart of the city itself.

The pre-drier 19 may be provided with a fan at the throat end thereof where the flue draft is not adequate to draw air through the radiator of the drum 19 and in that case where a fan is used the vapors may be blown directly into one of the cells of the incinerator 9 where any odors contained therein will be easily destroyed by the enormous heat. In ordinary cases, however, any odors which are thrown off from either the pre-drier 19 or the driers 26 are completely destroyed by the heat of the gases in the stack 11 coming from the incinerator 9 or from the boiler system 13. The finishing driers 26 are of standard pattern so that their internal construction need not be more specifically described, being readily understood by any one skilled in the art of manufacturing driers. The steam for the driers 26 is supplied by the boilers 10 and 13 or both as the case may be as is the steam required for rotating the driers or operating the various conveyers, shredders, etc.

Analysis of the final product shows that the material is high in food value ranging with oil cake meal.

It is obvious that a number of changes may be made in the specific construction of the plant as for instance instead of shredding the garbage but once in a shredder 15 the garbage may be repeatedly shredded, the important part of the process residing in the elimination of moisture without boiling the garbage.

The process above described is also suitable for use in connection with a fish drying plant and similar plants. In such cases the finished product is treated for its fertilizer value and not for its food value. The odors of a fish drying plant are even more offensive than those of the ordinary garbage disposal plant, but according to my new process the offensiveness to a very great extent is eliminated. It may be observed that after the material to be treated leaves the platform 2 where it comes into the plant it is continuously confined so that offensive odors do not enter the plant itself to any great degree. The air which might become tainted by contact with garbage, ash, refuse, etc., dumped upon the platforms 2 and 4 may be drawn downward by the well known type of blower fan which supplies the incinerator with forced draft thereby further eliminating obnoxious odors.

The shredders, conveyers, press and driers are all inclosed structures where that is necessary so that the material treated or the gases or vapors arising therefrom do not come into contact with the air in the plant until all the offensive ingredients have been extracted and the dry substances leave the driers 26.

Having thus described my invention what I claim is:

1. The process of treating garbage or other vegetable or animal matter which comprises shredding the same, compressing the shredded particles for the mechanical extraction of moisture, drying the same further in a moderate heat and finally treating the same by means of a higher degree of heat.

2. The process of treating garbage or other vegetable or animal matter which comprises shredding the same, compressing the shredded particles, drying the same in a moderate temperature, reshredding the same and then subjecting the reshredded material to a higher temperature.

3. The process of treating garbage which consists in separating the combustible parts thereof from the kitchen waste, converting the combustible part thereof into heat, shredding the kitchen waste, extracting moisture therefrom by mechanical compression and extracting further moisture therefrom by means of the heat generated through the incineration of the combustible portion of the garbage.

4. The process of treating garbage or other vegetable or animal matter which comprises subjecting the material while in its raw condition to a water extracting process consisting of a mechanical extraction followed by a further extraction of moisture therefrom by heat, the material being kept in a dry environment between these two steps, and maintaining in all stages of the process a temperature materially lower than the carbonizing temperature of the material under treatment.

5. The process of treating garbage or other vegetable or animal matter which comprises converting the material in its raw condition into granular particles of small size, extracting a part of its moisture by mechanical means, protecting the granules against absorption of water, conveying the same under such dry conditions to heat operated moisture extracting means, and then subjecting the granules in their raw unmoistened condition to a water extracting process and maintaining in all stages of the process a temperature materially lower than the carbonizing temperature of the material under treatment.

6. The process of treating garbage or other vegetable or animal matter which comprises converting the material in its raw condition into granular particles of small size, extracting a part of its moisture by mechanical means, protecting the granules against absorption of water, conveying the same under such dry conditions to heat operated moisture extracting means and then subjecting the material while in its raw unmoistened condition to a water extracting process and maintaining in all stages of the process a temperature materially lower than the carbonizing temperature of the material under treatment, carrying off the moisture and other gases in the form of vapor and consuming the noxious ingredients of said vapors in a very highly heated gas while recovering the constituents containing the caloric values of the garbage in the form of a dry, relatively odorless, uncharred mass.

7. The process of treating garbage or the like which consists in shredding the components thereof while in their original raw moist condition, squeezing the shredded material to extract a portion of the moisture, partially drying the squeezed material, reshredding the partially dried material and then thoroughly drying the same thereby producing a substantially uniform granular material retaining all of the caloric value of the original garbage.

8. The process of preparing stock food which consists in taking garbage or the like mixing and shredding the component parts thereof in their original raw condition, removing a portion of the moisture from the shredded material by mechanical means, partially drying and removing volatile substances from said material, reshredding the partially dried material and then thoroughly drying and practically deodorizing the same at a high temperature, thereby producing a substantially uniform granular material retaining all the food value of the original garbage but without offensive odor.

In testimony whereof, I have hereunto set my hand in the presence of two subscribing witnesses.

WILLIAM N. MORLEY.

Witnesses:
  H. M. CHRISTMAN,
  D. S. TOVELL.